(12) United States Patent
Anand

(10) Patent No.: US 11,861,405 B2
(45) Date of Patent: Jan. 2, 2024

(54) MULTI-CLUSTER CONTAINER ORCHESTRATION

(71) Applicant: KYNDRYL, INC., New York, NY (US)

(72) Inventor: Vishal Anand, Dublin (IE)

(73) Assignee: Kyndryl, Inc., New York, NY (US)

( * ) Notice: Subject to any disclaimer, the term of this patent is extended or adjusted under 35 U.S.C. 154(b) by 58 days.

(21) Appl. No.: 16/862,319

(22) Filed: Apr. 29, 2020

(65) Prior Publication Data
US 2021/0342193 A1    Nov. 4, 2021

(51) Int. Cl.
*G06F 9/50*    (2006.01)
*G06F 11/30*   (2006.01)
*G06F 11/34*   (2006.01)

(52) U.S. Cl.
CPC .......... *G06F 9/5038* (2013.01); *G06F 9/5077* (2013.01); *G06F 11/3006* (2013.01); *G06F 11/3409* (2013.01); *G06F 2201/81* (2013.01)

(58) Field of Classification Search
CPC .. G06F 9/5038; G06F 11/3409; G06F 9/5077; G06F 11/3006; G06F 2201/81
See application file for complete search history.

(56) References Cited

U.S. PATENT DOCUMENTS

2013/0204921 A1    8/2013   Diaz et al.
2016/0164914 A1*   6/2016   Madhav .................. H04L 63/20
                                                        726/1
2019/0050272 A1    2/2019   Liu et al.
2019/0102717 A1*   4/2019   Wu ..................... H04L 41/5025
2019/0179678 A1    6/2019   Banerjee et al.
(Continued)

FOREIGN PATENT DOCUMENTS

CN    106302628 A    1/2017
CN    106776005 A    5/2017
CN    109067827      12/2018
(Continued)

OTHER PUBLICATIONS

"Universal Control Panel overview," Docker, Inc., 2019, 2 pages.
(Continued)

*Primary Examiner* — Sisley N Kim
(74) *Attorney, Agent, or Firm* — CANTOR COLBURN LLP; Dan Housley

(57) ABSTRACT

Methods, computer program products, and systems are presented. The method computer program products, and systems can include, for instance: receiving, by a manager node, from a plurality of compute nodes metrics data, the manager node and the plurality of compute nodes defining a first local cluster of a first computing environment, wherein nodes of the compute nodes defining the first local cluster have running thereon container based applications, wherein a first container based application runs on a first compute node of the plurality of compute nodes defining the first local cluster, and wherein a second compute node of the plurality of compute nodes defining the first local cluster runs a second container based application; wherein the manager node has received from an orchestrator availability data specifying a set of compute nodes available for hosting the first application.

20 Claims, 8 Drawing Sheets

(56) References Cited

U.S. PATENT DOCUMENTS

2021/0149737 A1* 5/2021 An .................. G06F 9/5077
2021/0232440 A1* 7/2021 Ranjan ............... G06F 9/5083

FOREIGN PATENT DOCUMENTS

CN         110377395 A    10/2019
WO    WO2019184116 A1    10/2019

OTHER PUBLICATIONS

Kim, et al., "TOSCA-Based and Federation-Aware Cloud Orchestration for Kubernetes Container Platform," Appl. Sci. 2019, 191:doi10.3390/app9010191, www.mdpi.com/journal/appsci, 13 pages.
International Search Report and Written Opinion for PCT/IB2021/053002, dated Jul. 15, 2021 (9 pages).

* cited by examiner

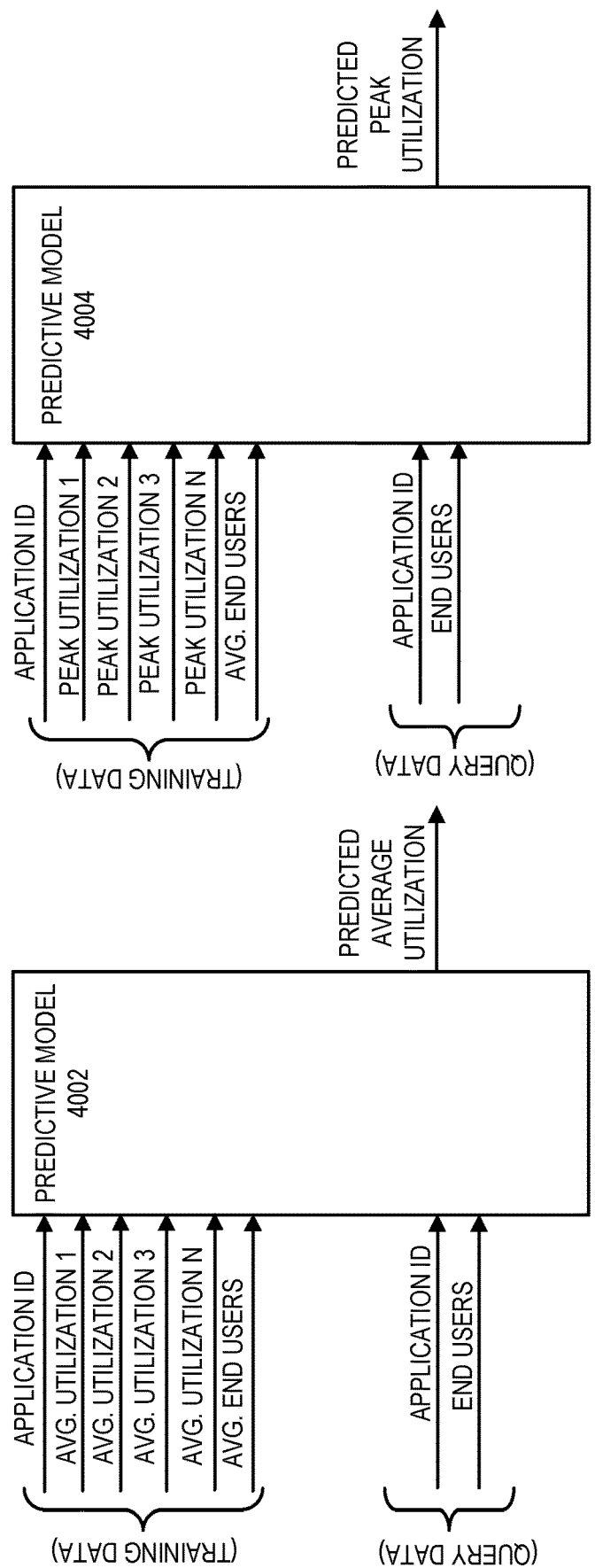

MULTI-CLUSTER CONTAINER ORCHESTRATION

BACKGROUND

Embodiment herein relate to software virtualization in general and specifically to management of container based virtual machines.

There are a plurality of cloud based computing environment providers on the market today, each of them offering specific services with service levels, targeting specific use cases, groups of clients, vertical and geographic markets. These cloud providers compete with services of traditional IT service providers which are operated typically in on-premise environments of client owned datacenters. While cloud providers seem to have advantages over said company-owned datacenters, they are not under direct control of the client companies and there is a substantial risk of failure to provide agreed service levels. Furthermore, cloud service providers might change their service levels, prices, and service offerings more often than traditional on-premise (owned by the service consumer) information technology providers.

With the advent of cloud computing the information technology industry has been undergoing structural changes. These changes not only affect information technology companies themselves, but also the industry in general for which information technology has become an essential part of their business operations. IT departments face the need of providing infrastructure faster, driven by their lines of business, internal clients, suppliers and external customers. On the other hand, the pressure on cost effectiveness and quality of service continue to be very high. A high level of security is of utmost importance. Cloud computing environments have to fulfill similar requirements as traditional data centers in this regard, but are perceived to provide services faster and cheaper, and to have virtually endless resources available.

With container-based virtualization, isolation between containers can occur at multiple resources, such as at the filesystem, the network stack subsystem, and one or more namespaces, but not limited thereto. Containers of a container-based virtualization system can share the same running kernel and memory space.

Container based virtualization is significantly different from the traditional hypervisor based virtualization technology involving hypervisor based virtual machines (VMs) characterized by a physical computing node being emulated using a software emulation layer.

Container based virtualization technology offers higher performance and less resource footprint when compared to traditional virtualization and has become an attractive way for cloud vendors to achieve higher density in the datacenter. Thus, containerization (i.e., operating a virtualized data processing environment using container-based virtualization) is changing how workloads are being provisioned on cloud infrastructure.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: receiving, by a manager node, from a plurality of compute nodes metrics data, the manager node and the plurality of compute nodes defining a first local cluster of a first computing environment, wherein nodes of the compute nodes defining the first local cluster have running thereon container based applications, wherein a first container based application runs on a first compute node of the plurality of compute nodes defining the first local cluster, and wherein a second compute node of the plurality of compute nodes defining the first local cluster runs a second container based application; wherein the manager node has received from an orchestrator availability data specifying a set of compute nodes available for hosting the first application, the set of compute nodes including a certain compute node, the certain compute node being located in a second local cluster of a second computing environment; in response to the first container based application terminating, examining the availability data specifying the set of compute nodes available for hosting the first application; selecting, in dependence on the examining, the certain compute node for hosting the first container based application; and sending, by the manager node, command data for respawning the first container based application on the certain compute node.

In another aspect, a computer program product can be provided. The computer program product can include a computer readable storage medium readable by one or more processing circuit and storing instructions for execution by one or more processor for performing a method. The method can include, for example: receiving, by a manager node, from a plurality of compute nodes metrics data, the manager node and the plurality of compute nodes defining a first local cluster of a first computing environment, wherein nodes of the compute nodes defining the first local cluster have running thereon container based applications, wherein a first container based application runs on a first compute node of the plurality of compute nodes defining the first local cluster, and wherein a second compute node of the plurality of compute nodes defining the first local cluster runs a second container based application; wherein the manager node has received from an orchestrator availability data specifying a set of compute nodes available for hosting the first application, the set of compute nodes including a certain compute node, the certain compute node being located in a second local cluster of a second computing environment; in response to the first container based application terminating, examining the availability data specifying the set of compute nodes available for hosting the first application; selecting, in dependence on the examining, the certain compute node for hosting the first container based application; and sending, by the manager node, command data for respawning the first container based application on the certain compute node.

In a further aspect, a system can be provided. The system can include, for example, a memory. In addition, the system can include one or more processor in communication with the memory. Further, the system can include program instructions executable by the one or more processor via the memory to perform a method. The method can include, for example: receiving, by a manager node, from a plurality of compute nodes metrics data, the manager node and the plurality of compute nodes defining a first local cluster of a first computing environment, wherein nodes of the compute nodes defining the first local cluster have running thereon container based applications, wherein a first container based application runs on a first compute node of the plurality of compute nodes defining the first local cluster, and wherein a second compute node of the plurality of compute nodes defining the first local cluster runs a second container based application; wherein the manager node has received from an orchestrator availability data specifying a set of compute nodes available for hosting the first application, the set of compute nodes including a certain compute node, the certain compute node being located in a second local cluster of a second computing environment; in response to the first container based application terminating, examining the availability data specifying the set of compute nodes available for hosting the first application; selecting, in dependence on the examining, the certain compute node for hosting the first container based application; and sending, by the manager node, command data for respawning the first container based application on the certain compute node.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4A depicts a machine learning prediction process according to one embodiment;

FIG. 4B depicts a machine learning prediction process according to one embodiment;

DETAILED DESCRIPTION

Figure 1:
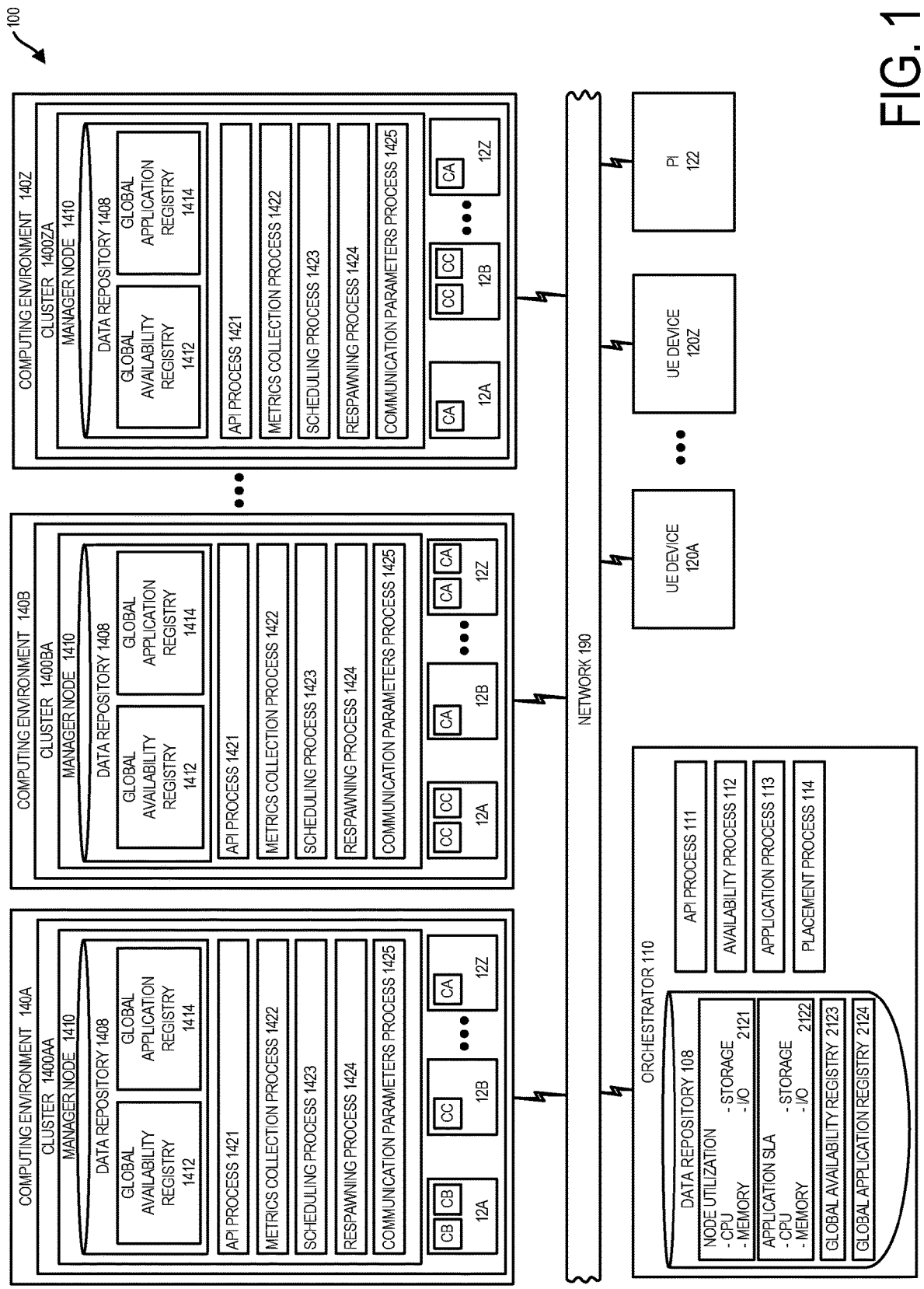
FIG. 1 depicts a system having a plurality of computing environments, and an orchestrator according to one embodiment.

System 100 for hosting container based virtual machines between different computing environments are as illustrated in FIG. 1. System 100 can include orchestrator 110 having an associated data repository 108, user equipment (UE) devices 120A-120Z, one or more process interface (PI) 122 and computing environments 140A-140Z. Orchestrator 110, UE devices 120A-120Z and computing environments 140A-140Z can be in communication with one another via network 190. Network 190 can be a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. UE devices 120A-120Z can be associated e.g. to enterprise agent users and end users. Enterprise agent users can be associated to enterprises that have their applications hosted within one or more of computing environments 140A-140Z and end users can be users who use the services that are provided by such hosted applications.

Computing environments 140A-140A of system 100 can be associated to respective computing environment providers. Computing environments of computing environments 140A-140Z can include e.g. private computing environments and public computing environments. Computing environments of computing environments 140A-140Z can include one or more private computing environment known as, e.g., an internal or enterprise cloud that resides, e.g., on an enterprise's intranet or hosted data center. Alternatively or additionally, computing environments of computing environments 140A-140Z can include one or more shared public computing environment shared by multiple enterprise tenants with use of a multi-tenant cloud architecture. According to one embodiment, where computing environments 140A-140Z include computing environments configured as public cloud computing environments, computing environment providers associated to respective computing environments 140A-140Z, can be providers known as public cloud services providers, e.g., IBM® CLOUD® cloud services, AMAZON® WEB SERVICES® (AWS®), or MICROSOFT® AZURE® cloud services (IBM® and IBM CLOUD are registered trademarks of International Business Machines Corporation, AMAZON®, AMAZON WEB SERVICES® and AWS® are registered trademarks of Amazon.com, Inc, and MICROSOFT® and AZURE® are registered trademarks of Microsoft Corporation.) Embodiments herein can be described with reference to differentiated fictitious public computing environment (cloud) providers such as ABC-CLOUD, ACME-CLOUD, MAGIC-CLOUD, and SUPERCONTAINER-CLOUD.

According to one embodiment, respective ones of computing environments 140A-140Z can map to one computing environment provider and each computing environment provider can operate one computing environment of computing environments 140A-140Z. According to one embodiment, each of computing environments 140A-140Z can map to one computing environment provider and each computing environment provider can operate one or multiple computing environments of computing environments 140A-140Z.

Orchestrator 110, according to one embodiment, can be external to each of computing environments 140A-140Z. Orchestrator 110 according to one embodiment can be co-located with one or more computing environment of computing environments 140A-140Z.

Each of the different UE devices 120A-120Z can be associated to a different user. Regarding UE devices 120A-120Z, a UE device of UE devices 120A-120Z, in one embodiment, can be a computing node device provided by a client computer, e.g. a mobile device, e.g., a smartphone or tablet, a laptop, smartwatch or personal computer that runs one or more program, e.g., including a web browser for opening and viewing web pages.

Orchestrator 110 can be configured to have features to intelligently support placement and respawning of containers amongst compute nodes of computing environments 140A-140Z. Orchestrator 110 can be configured to iteratively obtain metrics data from respective ones of computing environments 140A-140Z and using the iteratively obtained metrics data can iteratively update data repository 108.

Data repository 108 of orchestrator 110 can store various data. In node utilization area 2121, data repository 108 can store historical node utilization metrics data values over time. Metrics data collected by orchestrator 110 and stored in node utilization area 2121 can be associated to, e.g., a container and application ID and node identifier so that the stored data provides statistics on node performance as well as application performance over time. Node utilization metrics data can include lower layer metrics data, e.g., CPU utilization data, memory utilization data, storage utilization data, and I/O utilization data. Node utilization metrics data can alternatively or additionally include higher layer metrics data, e.g., latency utilization data, errors utilization data, traffic utilization data, and saturation utilization data. Node utilization metrics data when collected can be expressed in terms of raw utilization values and as percent of maximum utilization values. Thus, orchestrator 110 can extract node capacity values from utilization values.

Received metrics data for storage in node utilization area 2121 can also include capacity data, e.g., in terms of maximum number of hardware interrupts per second, thread switches per second in the case of CPU capacity, memory space capacity in the case of memory storage space capacity in the case of storage and bandwidth for I/O capacity.

Data repository 108 in application service level agreement (SLA) area 2122 can store SLA parameter values for SLA parameters specified by an enterprise using system 100. System 100 can be configured so that an enterprise agent user can be presented a user interface (UI) e.g. on UE device 120A that allows the enterprise agent user to specify SLA parameter values for container-based applications associated to the hosting request. SLA parameters can include, e.g., CPU related parameters, memory related parameters, storage related parameters, I/O related parameters (lower layer parameters), latency related parameters, errors related parameters, traffic utilization parameters, saturation related parameters (higher layer parameters).

Data repository 108 in global availability registry 2123 can store an iteratively updated list of available compute nodes within system 100 available to host a container based application. Global availability registry 2123 can store data on predicted availability of compute nodes within system 100 across a plurality of availability performance metrics, e.g., CPU availability, memory availability, storage availability, and I/O availability. Performing predictions as to availability of a compute node can be performed using various techniques, e.g., machine learning employing regression analytics, and other machine learning techniques. Global availability registry 2123 can store data indicating the availability of respective compute nodes of system 100 to host one or more new respawned container.

Data repository 108 in global application registry area 2124 can store data on predicted utilization characteristics of hosted container based applications hosted within system 100 based on historical hosted container based applications that are placed and/or respawned within system 100.

Orchestrator 110 can predict runtime utilization characteristics of a container based application running within system 100 using, e.g., a combination of historical application utilization data stored within node utilization area 2121 and SLA parameter values stored in area 2122. Global applications registry 2124 can store data indicating characteristics of container based applications as determined from obtained metrics data.

Orchestrator 110 can run various processes. Orchestrator 110 can run e.g. application programming interface (API) process 111, availability process 112, application process 113, and placement process 114.

Orchestrator 110 miming API process 111 can make calls for data on clusters of computing environments 140A-140Z and can responsively examine return data in structured form system clusters, e.g. in XML format or JSON format.

Orchestrator 110 running API process 111 can also iteratively push updated global registry data and global application registry data to data repositories associated to respective clusters of computing environments 140A-140Z. Global registry data and global application registry data can include e.g. tables, ordered lists, and/or trained predictive models that have been trained by machine learning. Orchestrator 110 running availability process 112 can predict an availability of compute nodes of computing environments 140A-140Z using metrics data stored in node utilization area 2121 of orchestrator data repository 108. API process 111 or orchestrator 110 can be provided using an open service broker API. An open service broker API can facilitate such functions as (a) obtaining data on services and a service broker provides; (b) provisioning service instances; (c) connecting container based applications to service instances; and (d) deprovisioning service instances.

Orchestrator 110 running application process 113 can predict application utilization characteristics of container based applications running in system 100 during a next time period. Orchestrator 110 running application process 113 can use e.g. metrics data of node utilization area 2121 as well as application SLA parameter data of application SLA area 2122 of orchestrator data repository 108.

Orchestrator 110 running placement process 114 can determine an initial placement of a container based application responsively to a request to host a container based application received on behalf of an enterprise. Orchestrator 110 running placement process 114 can examine, e.g., metrics data of node utilization area 2121 can examine, e.g., application SLA parameter data provided in application SLA area 2122 presented by an enterprise agent user as well as data of global availability registry 2123 indicating availability data of various nodes of system 100.

Figure 5:
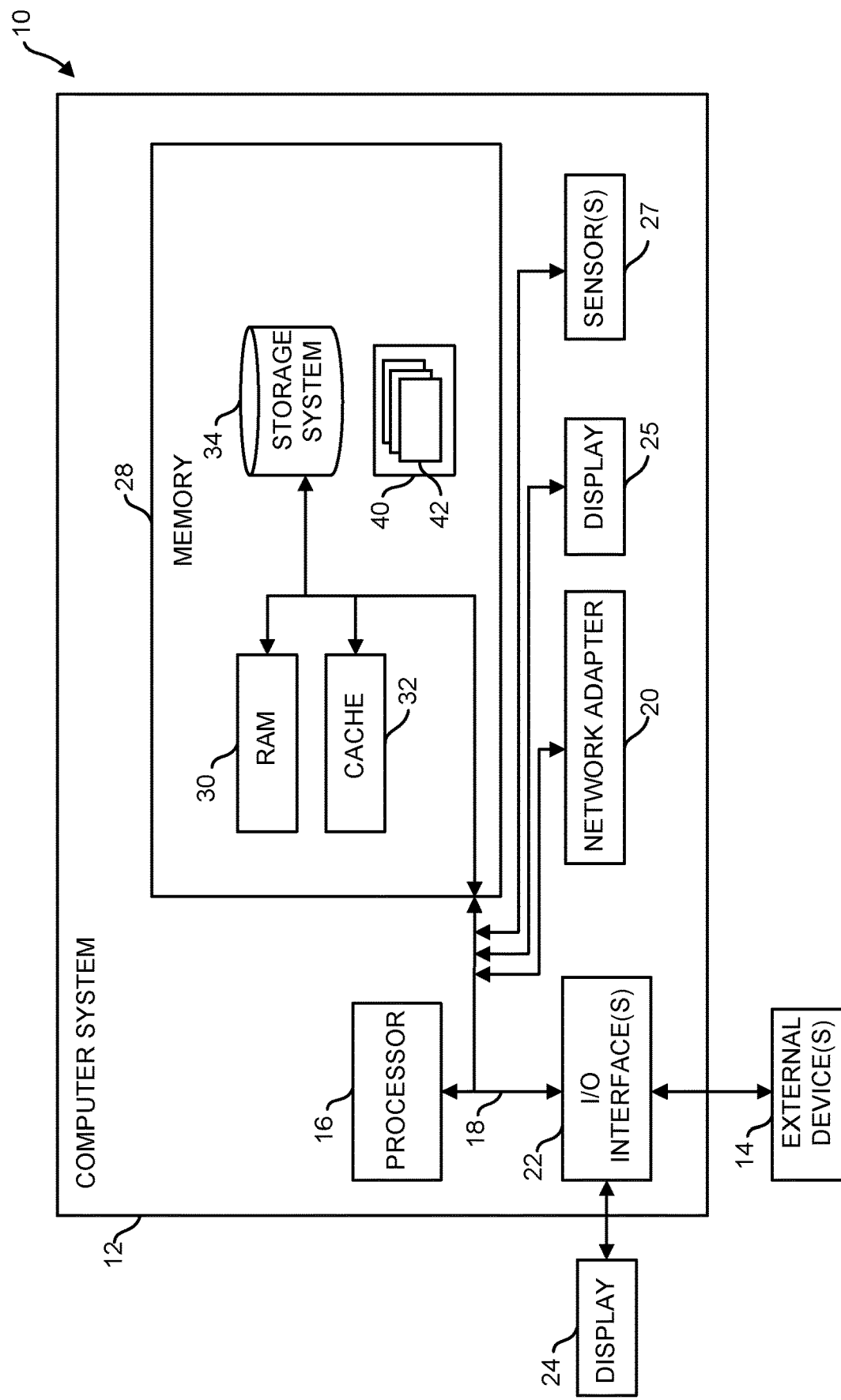
FIG. 5 depicts a computing node according to one embodiment.

Respective ones of computing environments 140A-140Z can include one or more cluster. For example, computing environment 140A can include cluster 140AA. Computing environment 140B can include cluster 140BA and computing environment 140Z can include cluster 140ZA. Respective ones of computing environments 140A-140Z can include, e.g., a single cluster or multiple clusters. For example, in one embodiment, computing environment 140A can include clusters 1400AA to 1400AZ of which cluster 1400AA is depicted. Respective clusters, such as cluster 1400AA, 1400BA, and 1400ZA, can include a respective set of compute nodes 12A-12Z. Respective clusters of system 100 can include compute nodes 12A-12Z. Respective compute nodes can be defined, e.g., by a physical computing node 10 according to FIG. 5 provided by a bare metal machine or alternatively, a compute node herein can be provided by a hypervisor based virtual machine (VM).

It will be recognized that each computing environment of computing environments 140A-140Z of system 100 can include a plurality of clusters. For example, computing environment 140A can include clusters 1400AA-1400AZ. Computing environment 140A can include clusters 1400BA-1400BZ. Computing environment 140Z can include clusters 1400ZA-1400ZZ. The fill set of clusters of system 100 can be referred to herein as clusters 1400AA-1400ZZ, each having a manager node 1410 and a plurality of compute nodes 12A-12Z.

A respective compute node 12A-12Z of a cluster can host one or more container. A container can be mapped to a specific application and an application mapping to a container can be regarded to be a container based application. In the described example of FIG. 1, container CA runs application A, container CB runs application B, and container CC runs application C.

Containers herein provide operating system level virtualization to deliver software in a package. Containers herein can be isolated from one another and can bundle their own software libraries, configuration files, and the like. Containers herein can communicate with each other through predetermined channels. Multiple containers running on a common compute node can share the operating system (OS) of the compute node.

A respective cluster of system 100, in addition to including a plurality of compute nodes 12A-12Z, can include a manager node 1410. Manager node 1410 of a respective cluster can include an associated data repository 1408 that stores global availability registry 1412 and global application registry 1414 pushed by orchestrator 110. Global availability registry 1412 can be iteratively pushed from data repository 108 by orchestrator 110. Global application registry 1414 can be iteratively updated based on data of global application registry 2124 of data repository 108 of orchestrator 110.

Global availability registry 1412 can store data on predicted availability of compute nodes 12A-12Z distributed throughout system 100, i.e., compute nodes 12A-12Z of computing environment 14A as well as compute nodes 12A-12Z of computing environments 14B-14Z, 140A, 140B-140Z. Global application registry 1414 iteratively updated by orchestrator 110 can store data on predicted utilization characteristics of container based applications running in system 100.

Manager node 1410 can run various processes. Manager node 1410 running API process 1421 can e.g. receive global availability registry data from orchestrator 110 as well as global application registry data from orchestrator 110. Manager node 1410 running API process 1421 can also call and collect metrics data from compute nodes 12A-12Z associated to its respective cluster. Manager node 1410 running API process 1421 can also send metrics data collected from compute nodes 12A-12Z associated to its respective cluster to orchestrator 110 for storage into node utilization area 2121 of data repository 108 on orchestrator 110. Manager node 1410 running metrics collection process 1422 can collect metrics data from compute nodes 12A-12Z from its associated cluster, e.g. cluster 1400AA, cluster 1400BA in the case of computing environment 140B, or cluster 1400ZA in the case of computing environment 140Z.

Metrics data collected can include, e.g., CPU utilization data, memory utilization data, storage utilization data, I/O utilization data (lower layer metrics data). Metrics data can also include capacity metrics data, e.g., capacity data in terms of CPU, memory, storage, and I/O associated to a particular compute node (lower layer metrics data). Metrics data collected can include, e.g., latency utilization data, error utilization data, traffic utilization data, and saturation utilization data (higher layer metrics data). Manager node 1410 running API process 1421 can include manager node 1410 supporting more than one API. Manager node 1410 running API process 1421 can feature a first API for support of communication of lower layer metrics data, and a second API for support of communication of higher layer metrics data. The first API for support of communication of lower layer metrics data can be provided using Prometheus® metrics collection service. Prometheus® is a registered trademark of the Linux Foundation. The second API for support of communication of higher layer metrics data can be provided using the ISTIO service mesh layer available from IBM Cloud™. IBM Cloud™ is a trademark of International Business Machines Corporation. ISTIO a configurable, open source service-mesh layer that connects, monitors, and secures containers in a container based cluster.

Manager node 1410 running scheduling process 1423 can identify and select a compute node of system 100 on which to respawn a container based application currently running on a cluster associated to manager node 1410. Manager node 1410 running scheduling process 1423 can include manager node 1410 determining that a termination event has occurred terminating a container. In response to the terminating, manager node 1410 can perform examining data of global availability registry 1412 and global application registry 1414 to identify and select a compute node of system 100 that defines a respawn location for the container to be respawned.

Manager node 1410 performing scheduling process 1423 can include manager node 1410 examining data of global availability registry 1412 and global application registry 1414 on the local cluster of manager node 1410 and based on the examining identifying and selecting a suitable compute node within any cluster of system 100 for hosting a respawned instance of the terminated container.

Notably, the selected compute node selected for hosting the respawning can either be a compute node of the certain cluster associated to manager node 1410 of the current cluster or can be a compute node of a cluster external to the current cluster such as an cluster of an external computing environment 140B or an external cluster of current computing environment 140A. In one scenario, manager node 1410 of cluster 1400AA can determine that a container has terminated and running scheduling process 1423, manager node 1410 can identify the compute node of cluster 140BA associated with computing environment 140B for hosting the respawned container.

Manager node 1410 running respawning process 1424 can perform respawning of a container on one of compute nodes 12A-12Z associated to the cluster to which manager node 1410 is associated. According to one scenario, manager node 1410 running respawning process 1424 can respawn a container previously running in cluster 1400AA. Manager node 1410 of cluster 1400AA running respawning process 1424 can respawn a container previously running within a cluster external to a current cluster of a computing environment external to computing environment 140A such as computing environment 140B. Manager node 1410 of cluster 1400AA running respawning process 1424 can respawn a container previously running within a cluster external to a current cluster of a computing within computing environment 140A.

Manager node 1410 of cluster 1400AA running communication parameters process 1425 can assign communication parameters e.g. IP addresses to newly placed respawned containers so that end users associated to UE devices of UE devices 120A-120Z can communicate with a hosted application hosted within one or more cluster.

Clusters herein, according to one embodiment, can perform functions in common with a Kubernetes® container management system. For example, compute nodes 12A-12Z, according to one embodiment, can have features and functions in common with a worker node of a Kubernetes® container management system. Manager node 1410 can have features and functions in common with a Kubernetes® master node, according to one embodiment. Kubernetes® is a trademark of the Linux Foundation. According to one embodiment, a cluster can have features in common with a Docker® Swarm™ container management system. Docker® Swarm™ is a trademark of Docker, Inc.

A method for performance by orchestrator 110, in communication with computing environments 140A-140Z and UE devices 120A-120Z, is described in connection with the flowchart of FIG. 2.

At block 1101, orchestrator 110 can be sending, using API process 1421, data call data for receipt by respective clusters of computing environments 140A-140Z.

The respective clusters of computing environments 140A-140Z can responsively send, at block 401, metrics data to orchestrator 110. The respective clusters of computing environments 140A-140Z, by their respective manager nodes 1410, can send the metrics data using respective API process 1421 of the respective manager nodes 1410. In response to receipt of the metrics data, orchestrator 110 can update global availability registry 2123 at block 1102 and can further update global application registry 2124 at block 1103. Performing blocks 1102 and 1103 and orchestrator 110 can initially update node utilization area 2121 to include most recent node utilization data for each node of each respective cluster 1400AA-1400AZ of system 100.

Metrics data sent at block 401 can include, e.g., CPU utilization data, memory utilization data, storage utilization data, and I/O utilization data. Metrics data sent at block 401 can also include, e.g., CPU capacity data, memory capacity data, storage capacity data, and I/O capacity data for storage into node utilization area 2121 of data repository 108. Metrics data sent at block 401 can include, e.g., latency utilization data, errors utilization data, traffic utilization data, and saturation utilization data (higher layer metrics data).

Global availability registry 2123 can store data specifying predicted availability of each compute node of system 100 at a next time relative to a current time. According to one embodiment, orchestrator 110 can apply regression analytics machine learning for updating a global availability registry 2123 at block 1102. For each compute node 12A-12Z in system 100, e.g. distributed throughout various ones of computing environments 140A-140Z, orchestrator 110 can perform regression analytics as described in connection with FIG. 3. Shown in FIG. 3A-3D, orchestrator 110 using regression analytics machine learning to predict availability of a certain compute node within a certain computing environment 140A-140Z is described in connection with FIGS. 3A-3D.

Figure 3A:
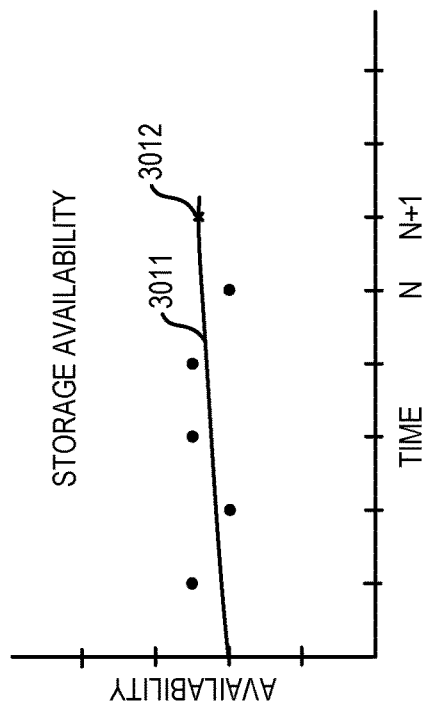
FIG. 3A depicts a machine learning prediction process according to one embodiment.

Referring to FIG. 3A, orchestrator 110 can plot a plurality of CPU availability values for a certain compute node over time up to the current time t=N and can plot regression line 3003 with reference to the plotted data values. Orchestrator 110, in the scenario described with reference to FIG. 3A, can determine that regression line value 3004 at a next time period t=N+1 relative to the current time t=N is the value for predicted CPU availability at a next time period.

Figure 3B:
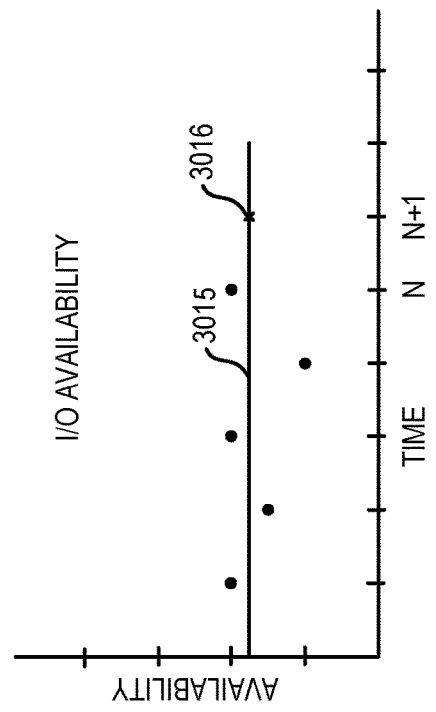
FIG. 3B depicts a machine learning prediction process according to one embodiment.

Referring to FIG. 3B, orchestrator 110 can plot a sequence of memory availability values for a certain compute node over time up to the current time t=N and can draw regression line 3007 based on the plotted data values. Orchestrator 110 can determine that regression line value 3008 at next time period, t=N+1 is the predicted memory availability value for the certain compute node during a next time period.

Figure 3C:
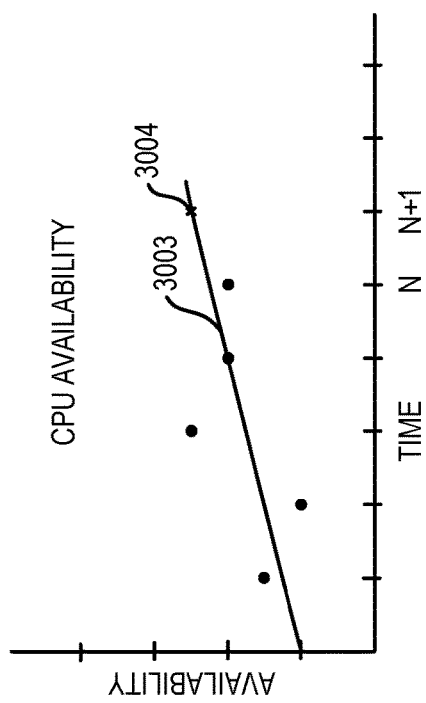
FIG. 3C depicts a machine learning prediction process according to one embodiment.

Referring to FIG. 3C, orchestrator 110 can plot a sequence of storage availability and metrics data values for a certain compute node from node utilization area 2121 over time and can plot regression line 3011 based on the plotted data values. Orchestrator 110 with regression line 3011 plotted can determine that regression line value 3012 is the predicted storage availability value at a next time period t=N+1 relative to the current time t=N.

Figure 3D:
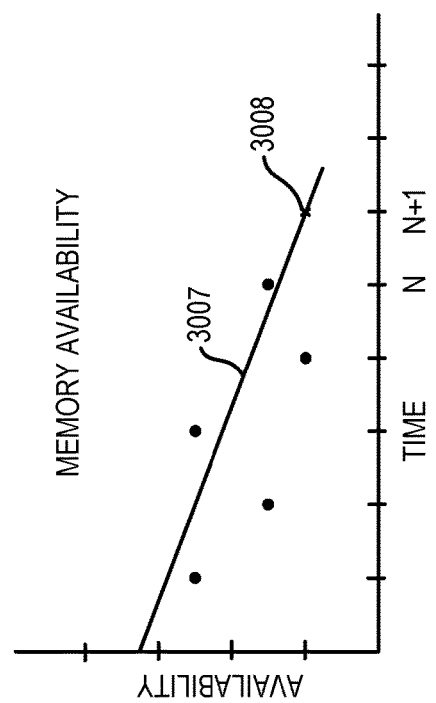
FIG. 3D depicts a machine learning prediction process according to one embodiment.

Referring to FIG. 3D, orchestrator 110 can plot a sequence of data values of I/O availability for a certain compute node up to the current time t=N and can plot regression line 3015 based on the plotted I/O availability data values. Using the regression line, orchestrator 110 can determine that regression line value 3016 is the predicted I/O availability at the next time period t=N+1 relative to the current time t=N. Orchestrator 110 can apply the described regression analysis to each compute node of system 100 being managed by orchestrator 110. Each cluster 1400AA-1400AZ of system 100 can include e.g. one to thousands of compute nodes. Orchestrator 110 can be iteratively updating predicted availability values for all compute nodes of system 100, e.g. each compute node 12A-12Z, of each cluster 1400AA-1400ZZ, of system 100 iteratively over time.

Historical availability values can be derived from utilization values, e.g. as the difference between a capacity value and a utilization value. A CPU availability parameter value can be derived as the difference between a CPU capacity value and a CPU utilization value. A memory availability parameter value can be derived as the difference between a memory capacity value and a memory utilization value. A storage availability parameter value can be derived as the difference between a storage capacity value and a storage utilization value. An I/O availability parameter value can be derived as the difference between a I/O capacity value and an I/O utilization value.

The regression analytics processing described with reference to FIGS. 3A-3D defines machine learning predictive models that can be iteratively trained over time with incoming training data, which training data can be provided by incoming metrics data sent at block 401.

Figure 3E:
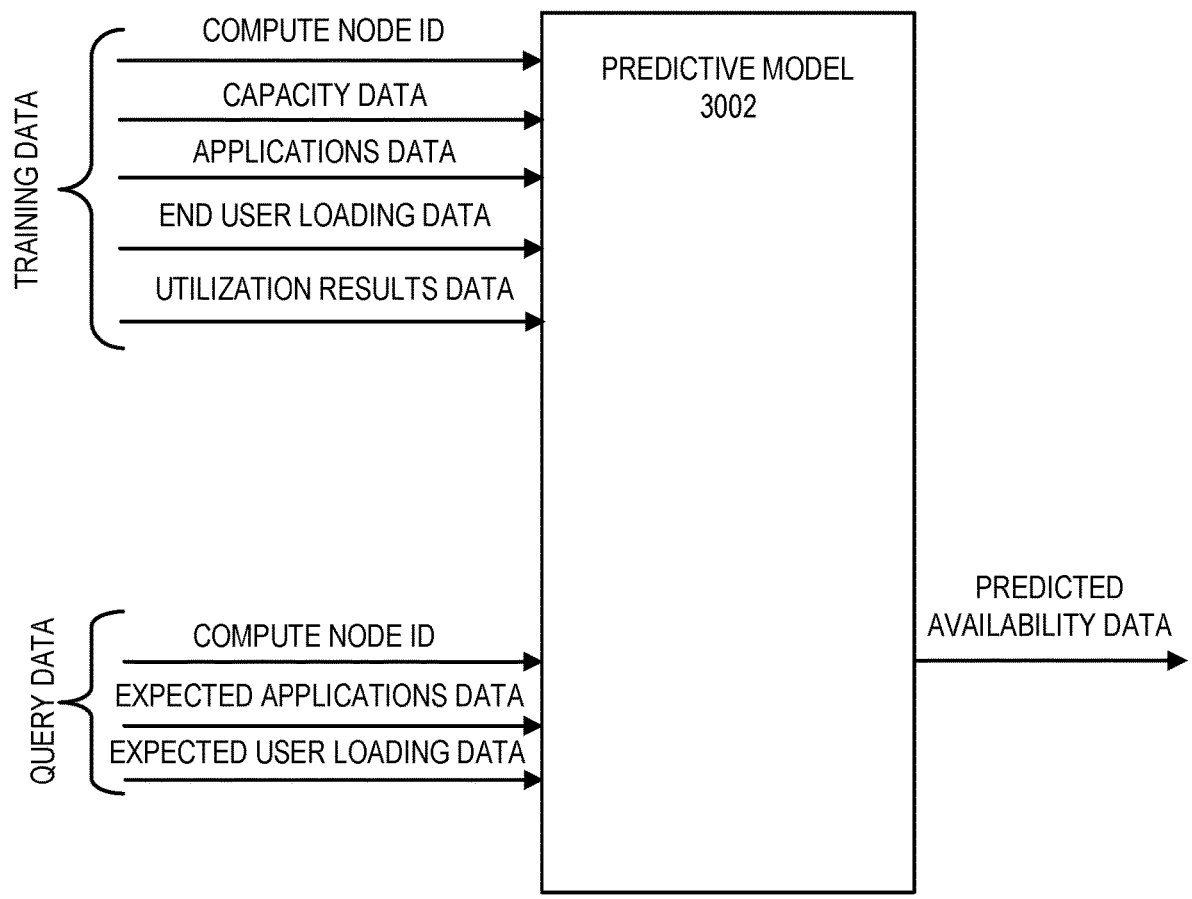
FIG. 3E depicts a machine learning prediction process according to one embodiment.

In FIG. 3E, there is depicted another predictive model for use in return of predicted computing node availability. Predictive model 3002 as depicted in FIG. 3E can be trained with use of iteratively applied training data. Orchestrator 110 can train predictive model 3002 according to one embodiment. Each iteratively applied training dataset can include e.g. for a given historical period of the deployment tenure of a compute node, the combination of (a) compute node ID, (b) capacity data specifying capacity metrics data for the compute node, e.g., in terms of CPU capacity, memory capacity, storage capacity, and I/O capacity, (c) applications data specifying the container based applications running on the given compute node of the given period, (d) user loading data, specifying a number of onboarded end users of the compute node for the given period, and outcome data provided by (e) utilization results associated to the given historical period.

The utilization results can be expressed in terms, e.g., of CPU utilization data, memory utilization data, storage utilization data, I/O utilization data, latency utilization data, errors utilization data, traffic utilization data, and/or saturation utilization data observed for the historical time period. The described training dataset can be applied for a succession of historical time periods for a deployment tenure for a compute node. Trained as described, predictive model 3002 is able to predict availability for a computer node for a next time period, t=N+1, based on e.g. the query data which can comprise, e.g., compute node ID, the applications running on the compute node, and user loading conditions. Where predictive model 3002 has been trained using both lower layer utilization data (such as CPU utilization data, memory utilization data, storage utilization data, and I/O utilization data), and higher layer utilization data (latency utilization data, errors utilization data, traffic utilization data, and/or saturation utilization data), expected higher layer utilization data for a next time period, t=N+1, can be input as part of the query data for output of data on predicted computer node availability.

Predictive model 3002, once trained, can be queried with use of query data. Query data can include a compute node ID, expected applications data for a next time period, expected user loading data, and expected higher layer utilization data, for a next time period. In response to the query data, predictive model 3002 can output a prediction specifying predicted availability for a compute node specified in the query data.

Orchestrator 110 can iteratively train the predictive models of FIGS. 3A-3E, and can iteratively query the trained predictive models to generate lists of predicted availability of each compute node of system 100 across a plurality of performance characteristics, e.g. involving CPU availability, memory availability, storage availability, and I/O availability. Orchestrator 110 can iteratively push such updated lists to respective manager nodes 1410. In addition or alternatively, orchestrator 110 can iteratively push most recently trained instances of trained predictive models as set forth in connection with FIGS. 3A-3E to manager nodes 1410 of the respective clusters 1400AA-1400ZZ of system 100.

Orchestrator 110 performing update global applications registry block 1103 is described in connection with predictive models 4002 and 4004. Referring to FIG. 4A, orchestrator 110 can train predictive model 4002 to predict average utilization for respective container-based applications run by system 100. Predictive model 4002 can be trained with training data and once trained can be configured to predict average utilization of an application across a plurality of metrics, e.g., CPU utilization data, memory utilization data, storage utilization data, I/O utilization data, latency utilization data, errors utilization data, traffic utilization data, and/or saturation utilization data. Predictive model 4002 can be trained with use of iteratively applied training datasets wherein each dataset is associated to one deployment period for a container previously run within system 100. An iteratively applied training dataset can include the combination of (a) application ID, (b) average utilization for a first metric e.g. CPU utilization, (c) average utilization per second metric, e.g., memory utilization, (d) average utilization for third metric, e.g., storage utilization, (e) average utilization for an Nth metric, e.g., I/O utilization, and (f) average number of end users associated to the deployment period. Predictive model 4002 once trained is able to respond to query data to generate a predicted average utilization for a certain application across a plurality of metrics, e.g., CPU metrics, memory metrics, storage metrics, and I/O metrics. Regarding (b)-(e), the first through Nth metrics can also or alternatively include higher layer metrics data, e.g., latency utilization data, errors utilization data, traffic utilization data, and/or saturation utilization data.

Query data that can be applied to predictive model 4002 for generation of a prediction output can include application ID in combination of number of end users. At block 1103, orchestrator 110 can query predictive model 4002 which predictive model can be previously trained prior to block 1103 in the background in response to updates of history data. Query data applied to predictive model 4002 for return of a prediction can include an application identifier and an end users value. The end users value can be an aggregated average of end users across historical deployment periods for an application. The number of end user associated to the just terminated container can be used as the end users value.

At block 1103, orchestrator 110 can query instances of predictive model 4002 which have been instantiated for each candidate container based application available in system 100. In one embodiment, the updated global application registry 2124 updated at block 1103 can include table data with updated data values specifying predicted average utilization values for various applications across varying metrics, e.g. CPU metrics, memory metrics, storage metrics, I/O available utilization metrics, latency utilization data, errors utilization data, traffic utilization data, and/or saturation utilization data.

To update global applications registry at block 1103, orchestrator 110 at block 1103 can additionally or alternatively be querying trained predictive model 4004 previously trained prior to block 1103. Predictive model 4004 can be trained in the manner of predictive model 4002 except that where average utilization metrics values were used for training of predictive model 4002, peak utilization metrics values were previously used for training predictive model 4004. Predictive model 4004, like predictive model 4002, can be trained to provide predictions for a plurality of applications, e.g. each candidate application available in system 100. Predictive model 4004, once trained, is able to respond to query data to provide a prediction as to predicted peak utilization for respective applications available in system 100 across multiple utilization parameters. Query data for querying predictive model 4004 can include application ID in combination with a value specifying a count of end users. The end users count value can be, for example, an aggregated average count of end users for the respective prior historical deployment periods associated to the applied training data for training predictive model 4004. System 100 can be configured so that whenever orchestrator 110 or a manager node 1410 generates a prediction as to an application utilization parameter value (e.g., CPU related, memory related, storage related, or I/O related) the prediction can be biased by, or replaced by, an SLA parameter value associated to the application utilization parameter.

Global application registry 2124, in addition to table values specifying predicted average utilization and predicted peak utilization for each respective applications available in system 100 across a plurality of metrics, can include most recent versions of predictive model 4002 and predictive model 4004 using most recently available training data. As noted, instances of predictive model 4002 and predictive model 4004 can be queried to predict utilization of each application running in system 100.

At block 1104, orchestrator 110 can send registry push data to respective ones of clusters within computing environments 140A-140Z. The pushed registry data can include updated data from global availability registry 2123 and global application registry 2124 as recently updated at blocks 1102 and 1103. Orchestrator 110 can send the registry push data through an API defined by API process 112 and the respective each cluster of system 100 can receive the registry push data through respective APIs defined by API process 1421 of the respective clusters. Registry push data can include e.g. table data specifying predicted availability characteristics of nodes 12A-12Z of each respective cluster of system 100 as well as table data specifying predicted application utilization characteristics of each respective candidate application that can be run by system 100.

In addition or alternatively, registry push data can include updated trained models that have been trained during the last training iteration as is explained further herein. Trained predictive models that can be pushed with registry push data pushed at block 1104 can include updated most recently trained instances of the predictive models of FIG. 3A-3D, predictive model 3002, predictive model 4002, and predictive model 4004 described in reference to FIGS. 4A and 4B. With trained models being pushed for use by each respective cluster 1400AA-1400ZZ, the trained models can be fast acting at the respective clusters having already been subject to training prior to pushing. At block 402, respective clusters 1400AA-1400ZZ can store the received registry push data sent at block 1104 into its respective data repository 1408 of cluster 1400AA-1400ZZ. The pushing of trained predictive models to respective manager nodes 1410 of clusters 1400AA-1400ZZ allows a respective manager node 110 to query a previously trained predictive model without further training and assures low latency response time of the respective manager nodes 1410 for selecting a respawn host in response to a container termination.

When instances of trained predictive models according to FIGS. 3A-3E, and 4A-4E have been pushed to a local cluster, the manager node 1410 can query the trained predictive models for local cluster generation of table data specifying predicted availability characteristics of nodes 12A-12Z and table data specifying predicted application utilization characteristics of respective candidate applications that can be run by system 100. The local cluster generated table data can be stored in global availability registry 1412 and global application registry 1412. In some embodiments, a manager node 100 of a local cluster can use a combination of orchestrator generated and local cluster generated prediction table data, e.g., can use the orchestrator generated table data for coarse filtering out of candidate compute nodes, and can query local instances of trained predictive models for return of higher accuracy prediction table data. Embodiments herein recognize that query data for querying predictive models 3002, 4002, and 4004 can include data in dependence on metrics data of a just terminated local container that is more readily available on the local cluster on which the container just terminated. The table data specifying predicted application utilization characteristics of respective candidate applications that can be run by system 100 can be limited to applications running on the local cluster to limit the querying time for table generation. In one embodiment predictive model querying of the trained predictive models according to FIGS. 3A-3E, and 4A-4E can be performed on demand in response to container termination to further reduce query time. For predictive models 4002, 4004 predictive model querying of the trained predictive models according to FIGS. 3A-3E, and 4A-4E can be performed on demand in response to container termination and can be restricted to the just terminated application to further reduce query time.

At block 1201, an enterprise agent user using a UE device of UE devices 120A-120Z can define and send hosting request data for receipt by orchestrator 110. In response to the receipt of the hosting request data, orchestrator 110 can perform action decision 1105 to determine initial placement of a container based application specified in the hosting request data sent at block 1201 on behalf of an enterprise by an enterprise agent user. For performing of action decision 1105, orchestrator 110 can examine data of global availability registry 2123 to determine which nodes are available to perform the hosting and also data of global application registry 2124.

At action decision block 1105, orchestrator 110 can examine data of global availability registry 2123 and global application registry 2124 in order to perform initial placement of a container based application specified in the hosting request data of block 1201. Based on the examination of global availability registry 2123 and global application registry 2124, orchestrator 110 can identify and select a compute node for hosting the application specified in hosting request data sent at block 1201. Orchestrator 110, for identification and selection of a compute node for hosting the application specified in hosting request data sent at block 1201, can apply criterion for hosting a respawned container (except criterion related to a just terminated container) as explained in action decision block 405.

Responsively at block 1106, orchestrator 110 can send hosting command data to the computing environment having the selected compute node. The hosting command data can be received by the manager node 1410 of the cluster in which the selected compute node is located. The manager node 1410, in response to the hosting command data, can spawn the selected container based application on the selected compute node.

At block 403, manager nodes 1410 of clusters 1400AA-1400ZZ distributed in computing environments 140A-140Z can perform event detection. Event detection can be triggered by a container based application terminating. Manager node 1410 by running of API process 1421 can be monitoring of lower layer metrics data (such as CPU utilization data, memory utilization data, storage utilization data, I/O utilization data), and higher layer utilization data (latency utilization data, errors utilization data, traffic utilization data, and/or saturation utilization data), for determination of whether a termination condition is satisfied and can send a termination command to terminate a container in response to the condition being satisfied. The condition can include the condition, e.g., that one more of the noted metrics data items has traversed a threshold (exceeded a high threshold or fallen below a low threshold). In the case manager node 1410 as defined on a Kubernetes® container management system, manager node 1410 performing event detection can include manager node 1410 monitoring lower layer "keepalive" signals from an agent (known as a Kubelet® agent) running on compute node.

In response to the event detection at block 403, the certain computing environment of computing environments 140A-140Z can, at send block 404, send metrics data to orchestrator 110. The metrics data sent at block 404 can include metrics data of the deployment period of the terminated container based application. Orchestrator 110, in response to the metrics data of the terminated container based application, can update global availability registry 2123 and global application registry 2124 to reflect the current compute node and application status of system 100.

Further, in response to the metrics data received in response to the sending at block 404, orchestrator 110 can perform training of the predictive models of FIG. 3A-3E and predictive models 4002 and 4004 as described in connection with 4A and 4B at training block 1107 using the metrics data as training data. The metrics data sent at block 404 can include such metrics data as metrics data associated with the deployment period of a container based application just terminated. The metrics data can include metrics data defining an iteration of training data described in connection with predictive model 4002 and predictive model 4004 described in connection with FIGS. 4A and 4B. Another event that can be detected at block 403 can include termination of a compute node. System 100 can be configured so that in response to termination of a compute node training of the predictive models of FIG. 3A-3E can be commenced at training block 1107 using metrics data of the deployment period of the terminated container as training data.

Orchestrator 110 at block 1107 can initiate training. That is, training can be initiated at block 1107 and can be performed in the background and parallel with subsequent actions performed by orchestrator 110.

Various available tools, libraries, and/or services can be utilized for implementation of predictive model 3002, predictive model 4002, and/or predictive model 4004. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE 0 SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access to a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive model 3002, predictive model 4002 and/or predictive model 4004 can include use of e.g. support vector machines (SVM), Bayesian networks, neural networks and/or other machine learning technologies. The predictive models of FIGS. 3A-3E, and 4A-4B can be trained with use of historical data stored in data repository 108.

Subsequent to event detection at block 403, the cluster associated to the event detection at block 405 can perform an action decision. The action decision can be an action decision to respawn the container based application just terminated at block 403. For performance of the action decision at block 405, the certain cluster of clusters 1400AA-1400ZZ can identify and select a compute node for respawning the just terminated container based application.

The action decision at block 405 can be an action decision to identify and select a compute node for respawning the just terminated container. For performing the action decision of action decision block 405, the certain manager node associated to the event detection at block 403 can examine data of its respective global availability registry 1412 and its global application registry 1414 to select an appropriate compute node for hosting of the just terminated container.

According to one embodiment, global availability registry 1412 can store iteratively updated data specifying predicted availability characteristics for respective compute nodes of system 100. The data can include, e.g., predicted CPU availability characteristics, predicted memory characteristics, predicted storage characteristics, and/or predicted I/O characteristics. According to one embodiment, global application registry 1414 can store iteratively updated data specifying predicted utilization characteristics for respective container based applications of system 100. The data can include, e.g., predicted CPU utilization characteristics, predicted memory utilization characteristics, predicted storage utilization characteristics, predicted I/O characteristics, predicted latency characteristics, predicted error characteristics, predicted traffic characteristics, and/or predicted saturation characteristics. The iteratively updated data of global availability registry 1412 and global application registry 1414 can include, e.g., table data, lists, and/or trained predictive models.

Manager node 1410 performing scheduling process 1423 can include manager node 1410 examining data of global availability registry 1412 and global application registry 1414 on the local cluster of manager node 1410 and based on the examining identifying and selecting a suitable compute node within any cluster of system 100 for hosting a respawned instance of the terminated container. Manager node 1410 examining data of global availability registry 1412 and global application registry 1414 can include, e.g., manager node 110 examining orchestrator and/or local cluster generated table data, and/or querying local cluster instances of the trained predictive models of FIGS. 3A-3E, and FIGS. 4A-4B.

For identification and selection of a compute node, manager node 1410 can identify for the just terminated container based application, the most significant utilization parameter for the just terminated container based application. The most significant predicted utilization parameter can be the predicted utilization parameter (e.g. CPU, memory, storage, I/O) that exceeds a baseline value by the largest percentage amount. For example, manager node 1410 can determine that the just terminated container based application is a CPU intensive application based on a predicted CPU utilization value exceeding a baseline value by the largest percentage amount relative to other performance characteristics. For example, manager node 1410 can determine that the just terminated container based application is a memory intensive application based on a predicted memory utilization value exceeding a baseline value by the largest percentage amount relative to other performance characteristics. Once manager node 1410 determines that the terminated container based application is a CPU intensive application, manager node 1410 can identify a suitable node having predicted CPU availability parameter value exceeding a threshold value. Once manager node 1410 provisionally matches an application to a compute node based on the most significant predicted utilization value for the terminated container based application manager node 1410 can then verify the selection by confirming that for remaining predicted utilization parameters, values (using predictive models 4002, 4004) are below the predicted availability value of the provisionally selected compute node, e.g., using the predictive models of FIG. 3A-3E.

Manager node 1410, according to one embodiment, can score each compute node 12A-12Z of system 100 across all clusters for suitability for hosting a just terminated container based application. Manager node 1410 can score each candidate compute node for compatibility across a plurality of utilization and corresponding compute node availability parameters, and can select the highest scoring compute node as the respawn hosting compute node.

Manager node 1410 can score each candidate compute node of system 100 according to the scoring formula of Eq. 1 according to one embodiment.

$$SCN = F1\,W1 + F2\,W1 + F3\,W3 + F4\,W4 \qquad (\text{Eq. 1})$$

Where SCN is a suitability score assigned to each candidate compute node of system 100, F1-F4 are factors and W1-W4 are weights associated to the various factors. A respective factor can be suitability of a respective candidate compute node with reference to an availability parameter in relation to a utilization parameter associated to the availability parameter for the just terminated application. According to one embodiment, factor F1 can be a suitability value based on predicted CPU availability of a candidate compute node with reference to predicted CPU utilization for the just terminated container based application, factor F2 can be a suitability value based on predicted memory availability of a candidate compute node with reference to predicted memory utilization for the just terminated container based application, factor F3 can be a suitability value based on predicted storage availability of a candidate compute node with reference to predicted storage utilization for the just terminated container based application, factor F4 can be a suitability value based on predicted I/O availability of a candidate compute node with reference to predicted I/O utilization for the just terminated container based application. Manager node 1410 can apply weights to the set of factors, each factor defined by a utilization parameter and associated availability parameter. Manager node 1410 can apply the greatest weight to the factor associated to the most significant utilization parameter for the just terminated container based application, and can apply lesser weights to factors associated to remaining utilization parameters.

Once manager node 1410 provisionally matches a just terminated container based application to a compute node based on the most significant predicted utilization value for the terminated container based application and/or using Eq. 1, manager node 1410 can further verify the selection by confirming that for predicted higher layer utilization parameter values (predicted latency characteristics, predicted errors characteristics, predicted traffic characteristics, and/or predicted saturation characteristics) are within specified ranges, e.g., predetermined ranges or dynamically determined ranges.

Embodiments herein recognize that the most significant predicted utilization parameter for a container based application can be differentiated in dependence on the functions associated with the application. In a vacation planning service, there can be various different container based applications, e.g., a booking container based application, a payment container based application, and a customer rewards container based application. Latency can be critical in the booking application but less critical in the customer rewards application. Accordingly, predicted I/O utilization can be greater in the booking container based application than in the customer rewards container based application.

In one scenario, manager node 1410 of cluster 1400AA at block 405 can return an action decision to select an appropriate compute node for hosting a respawn of the just terminated container terminated within cluster 1400AA. Based on features herein, the selected location for the respawned container can be a compute node within cluster 1400AA or external to cluster 1400AA such as a cluster 1400BA of an alternative computing environment hosting cluster 1400BA such as computing environment 140B, or a cluster of another computing environment such as computing environment 140Z. In response to the action decision to select a compute node for hosting the respawned container, manager node 1410 of cluster 1400AA at block 406 can send hosting command data to orchestrator 110. Orchestrator 110, in response to the hosting command data sent at block 406, can, at block 1108, redirect and forward the hosting command data to the appropriate cluster of system 100 which hosts the selected compute node selected at block 405. In one scenario, where the selected compute node for hosting a respawn is within cluster 1400BA, manager node 1410 of cluster 1400BA can receive the forwarded hosting command data sent at block 1108. Manager node 1410 of cluster 1400BA in the described scenario at block 407 can activate respawning process 1424 thereof to respawn the terminated container detected as terminated at event detection block 403.

Figure 2:
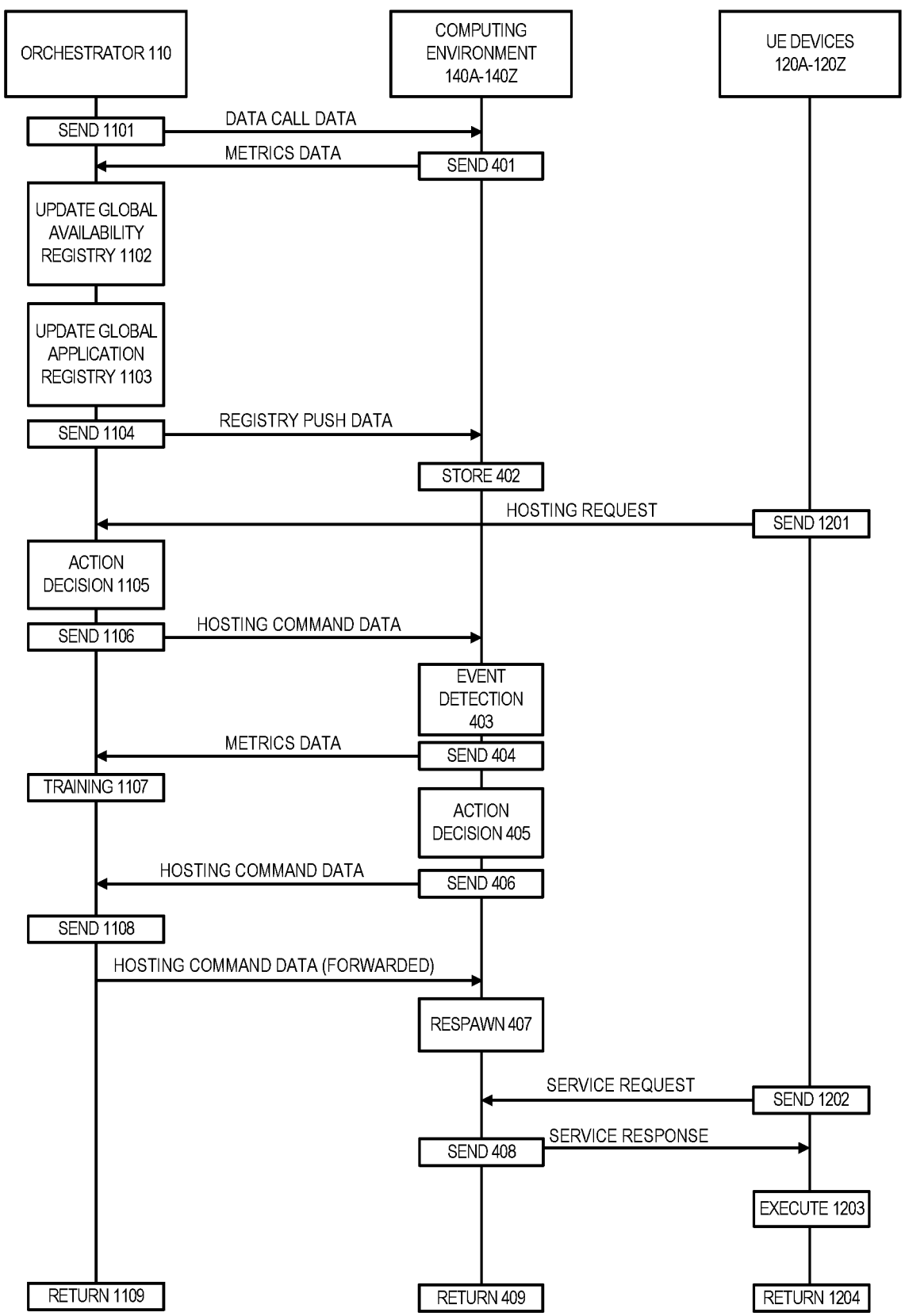
FIG. 2 is a flowchart illustrating a method for performance by an orchestrator in communication with a plurality of computing environments according to one embodiment.

For commanding respawning of a terminated container on a computing environment external compute node, manager node 1410AA can communicate to the respawn cluster via orchestrator 110 as depicted in the flowchart of FIG. 2 or through an alternate channel Manager node 1410 can send command data to orchestrator 110, which can use an open service broker API to communicate with manager nodes of external computing environments. Manager node 1410 to manager node 1410 communication can be performed, e.g., through a dedicated network link or through VPN over the public Internet.

For providing communication between a first manager node on a first cluster of a first computing environment and a second manager node on a second cluster of the second computing environment, cluster operators featuring YAML files can be configured. A cluster operator of manager node 1410 can include YAML files configured to facilitate communication with cluster external compute nodes including computing environment external compute nodes.

According to one embodiment, a cluster operator can be termed a proxy operator. Such a proxy operator can include a YAML file configuring the proxy operator to: (a) provide an API for the external computing environment where external compute nodes are placed; (b) provide authentication keys to authenticate a local manager node with a manager node of the external computing environment where the external compute node is located; and (c) control external traffic through Egress and Ingress proxies. Egress and Ingress proxies can control which traffic can be allowed out and in, respectively.

System 100 can have features to facilitate synchronized communication between a local manager node 1410 and an external computing environment manager node 1410. To facilitate synchronized communication between manager nodes of different computing environments, a distributed key value store can be provided, which can be defined by data repository 1408 physically provided by storage systems 34 (FIG. 5) associated to respective manager nodes 1410 of different computing environments. The distributed data store defined by respective data repositories 1408 of respective clusters 1400AA-1400AZ can be configured in accordance with ETCD. ETCD is an open source distributed key-value store used to hold and manage critical information for maintaining operation of a distributed system. A key value store can be used to manage, e.g., container configuration data, state data, and metadata to support container processes such as termination, respawning, and messaging.

For facilitation of synchronization, orchestrator 110 at data call send block 1101 can iteratively call for all manager nodes 1410 to report their current key value store to orchestrator 110 which responsively updates a master list and pushes an updated master list all manager nodes 1410 for storage respective data repositories 1408 so that every manager node 1410 in system has access to a replicated updated copy of distributed key value data store. The key value data store can configure manager nodes 1410 between different computing environments for synchronized scheduling, scaling, keepalive signaling, and respawning. For implementation of the distributed key value data store, every manager node 1410 in system 100 can have access to the full data store. System 100 can be configured to have no single point of failure, and system 100 can be configured so that every data 'read' returns the latest data 'write' across all clusters 1400AA-1400ZZ of system 100. System 100 can be configured to support automatic Transport Layer Security (TLS) and optional secure socket layer (SSL) client certificate authentication. System 100 can use a Raft consensus algorithm to ensure data store consistency across all nodes in a cluster and between different clusters.

At action decision block 405, the identification and selection by a manager node 1410 of a suitable compute node for respawning a terminated container based application can be conditioned on traffic data of the terminated container that indicates (a) a level of messaging between the terminated container and external containers of the local cluster (cluster 1400AA if the terminated container is in cluster 1400AA), and (b) a level of messaging between the terminated container and external containers of external computing node (clusters 1400BA-1400ZZ if the terminated container is in cluster 1400AA). According to one embodiment, manager node 1410 of each respective local cluster can run a traffic monitoring utility facilitating collection of monitoring data specifying instances of messaging between running containers of a current cluster. Monitoring data can be provided using an ISTIO service mesh layer available from IBM Cloud™. IMB Cloud™ is a trademark of International Business Machines Corporation. ISTIO is a configurable, open source service-mesh layer that connects, monitors, and secures containers in a container based cluster. Manager node 1410, based on the collected traffic data, can assign traffic scores to a just terminated container and classifications to the just terminated container in dependence on the traffic scores. Traffic scores can be assigned based on e.g. a count of messages and/or a count of bits transferred. According to one embodiment, manager node 1410 can classify a just terminated container using the decision data structure of Table A.

TABLE A

| Row | Local cluster traffic score, L | External computing environment traffic score, E | Terminated container classification |
|---|---|---|---|
| 1 | L > T1 | E > T2 | Neutral |
| 2 | L <= T1 | E > T2 | Global Communication Container (GCC) |
| 3 | L > T1 | E <= T2 | Local Communication Container (LCC) |
| 4 | L <= T1 | E <= T2 | Neutral |

Manager node 1410 can use the decision data structure of Table A to identify and select a compute node for hosting a respawned container. Referring to Table A, manager node 1410 can classify a terminated container as a Local Communication Container (LCC) where a local cluster traffic score, L, for the terminated container exceeds a first threshold, and the External computing environment traffic score, E, for the terminated container does not exceed a second threshold. Manager node 1410 can classify a terminated container as a Global Communication Container (GCC) where an External computing environment traffic score, E, for the terminated container exceeds a second threshold, and the Local cluster traffic score, L, for the terminated container does not exceed a first threshold. Manager node 1410 can be configured to restrict manager node 1410 from selecting of a compute node of an external computing environment cluster as the respawn host compute node where the classification of the terminated cluster is Local Communication Container (LCC). In the case manager node 1410 scores candidate compute nodes, and selects a highest scoring compute node as the respawn host, manager node 1410 can adjust a score for an external computing environment candidate compute node where the classification for the just terminated container is Global Communication Container (GCC). The adjusting can include biasing the score upward or removing a normally present negative bias. Manager node 1410 can permit external cluster respawning and external computing environment respawning where the classification of the just terminated container is Global Communication Container (GCC), or Neutral.

At block 1202, end user devices of UE devices 120A-120Z can be sending service requests to hosted containers of system 100 which can responsively send service response data at block 408 which response data can be executed by the various end user UE devices at block 1203.

At block 409, computing environments 140A-140Z can return to a stage preceding block 401 to repeat the loop of blocks 401-409. At block 1109, orchestrator 110 can return to a stage prior to block 1101 to iteratively perform the loop of blocks 1101-1109 which can be iteratively performed until the deployment period ends. At block 1204, UE devices 120A-120Z can return to a stage prior to block 1201 to iteratively perform the loop of blocks 1201-1204 which can be iteratively performed throughout a deployment period.

Embodiments herein recognize that in a containers cluster when containers are created on compute nodes, a replication controller and scheduler service on a manager node through an API can create multiple containers across the compute nodes within the cluster to ensure that the availability of the application inside the container is available, up and running.

Embodiments herein recognize that in a hybrid cloud system, enterprises can have multiple container clusters running across, e.g., on-premises, off-premises, private and public clouds which may be of the same provider or different providers, technologies, and/or platforms.

Embodiments herein recognize that in such a multi-container multi-computing environment system, developers and enterprise agent users do not have a choice and flexibility to decide on which compute node of a multiple computing environment application should provision their application, which application can be, e.g., CPU-intensive, memory-intensive, storage-intensive, or I/O intensive.

Embodiments herein recognize that with existing systems, an administrator user placement of applications can become a tedious task in multi-computing environment systems and can delay code release cycle, create performance bottlenecks in a production environment, and at worse, it can even fail the application and thus impact business adversely. Embodiments herein recognize that administrator users are limited in their choice of a resourceful target environment for their applications.

Embodiments herein recognize that in a container cluster, a manager node can control all activities on compute nodes of a cluster, can maintain a state within a container environment and can provide an API that tooling and systems interact with. A scheduler can be responsible for determining pod placement by taking current memory, CPU, and other environment utilization into account when placing pods on nodes and for application high availability, spread pod replicas between nodes. A replication controller can ensure that a specified number of pod replicas remain running at all times and if pods exit or are deleted, a replication controller can instantiate new replicas.

There is set forth herein an orchestrator 110 which can be termed a farm controller engine (FCE). Orchestrator 110 can group master and worker nodes for CPU, Memory, Storage (and/or any other resource) and can store various data in a data store defined in data repository 108. Data that can be stored can include, e.g., configuration data and metadata. Orchestrator 110 can run as a separate process with exposed API to communicate to APIs of multiple manager nodes associated to different clusters 1400AA-1400ZZ. Orchestrator 110 allows users and developers to enter choices during provisioning of an application, e.g., on whether they prefer a CPU intensive compute node or a memory intensive compute node.

Orchestrator 110 can send parameters/variables to a corresponding manager node 1410 through an API of the orchestrator 110. Specific scheduler and replication controllers of a manager node 1410 can then communicate with appropriate compute nodes in a cluster. Orchestrator 110 can record overwritten preferences by the users through 'keepalive' mechanism and can iteratively update orchestrator 110 and corresponding schedulers and replication controller(s) of respective manager nodes 1410 in regular intervals. Orchestrator 110 can enable a unified system for cross-container placements and thus creates container based application farms based on the specific needs of developers and their applications/codes in terms of resources like CPU, memory, storage, I/O and the like.

With configuration of orchestrator 110, orchestrator 110 can run as a process on a hypervisor based virtual machine (VM) or a container based VM, or a physical computing node 10 in any computing environment. There can be provided an orchestrator API to manager node API communication layer. An orchestrator data store defined by data repository 108 can contain information about each cluster of clusters 1400AA-1400AZ including its manager node 1410, compute nodes 12A-12Z, APIs, and the like. Orchestrator 110 can provide a user interface (UI) for authenticating/authorizing developers and users for the selection of a target container computing environment. Orchestrator 110 can create multiple application farms defined by compute nodes adapted to support a specified utilization in a computing environment. Orchestrator 110 can logically group compute nodes with the preferences in respect to resources such as CPU, Memory, Storage, I/O, and the like. An orchestrator 110 and manager nodes 1410 can use ping-pong keepalive mechanisms to provide a choice to developers/users to be able to select a specific container hosting computing environment. Orchestrator 110 can allow overwriting to the previous selections/choices and can push the new choice/selections to corresponding manager nodes through respective APIs of the orchestrator and manager nodes 1410.

Certain embodiments herein may offer various technical computing advantages involving computing advantages to address problems arising in the realm of computer networks. Embodiments herein can feature an orchestrator in communication with manager nodes of multiple clusters. The multiple clusters can be disposed in multiple computing environments. The orchestrator can gather metrics data for the various clusters and can orchestrate respawning of terminated containers. An orchestrator can iteratively push a global availability registry and a global application registry to a manager node of respective clusters in a multi-cluster multiple computing environment system. The global availability registry and a global application registry can include trained predictive models, that are previously trained at a time of arrival at a manager node. A manager node can therefore query a trained predictive model for reduced latency in rendering action decisions. Action decisions can include action decisions to identify a respawn host for hosting a terminated container to be respawned. A manager node can respond to a termination of a container by selecting a compute node for hosting a respawned container, and respawning the terminated container on the selected respawn compute node. The respawned container can be hosted within a computing environment external to a computing environment in which the container was terminated. A manager node can classify a terminated container in dependence on traffic of the container during a deployment period of the container. A manager node can select a compute node for hosting a respawn of the terminated container in dependence on the classification. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 6:
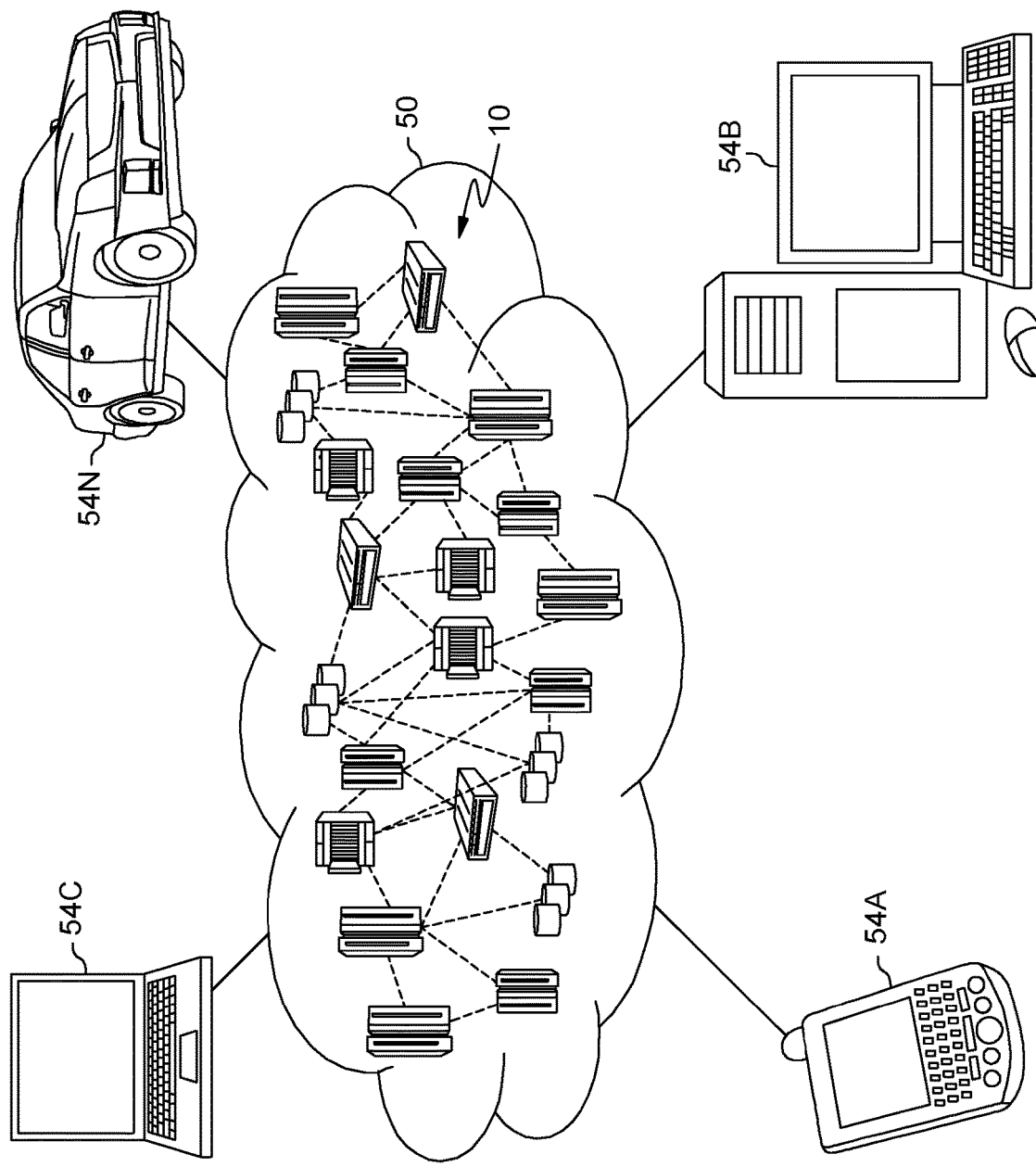
FIG. 6 depicts a cloud computing environment according to one embodiment.
Figure 7:
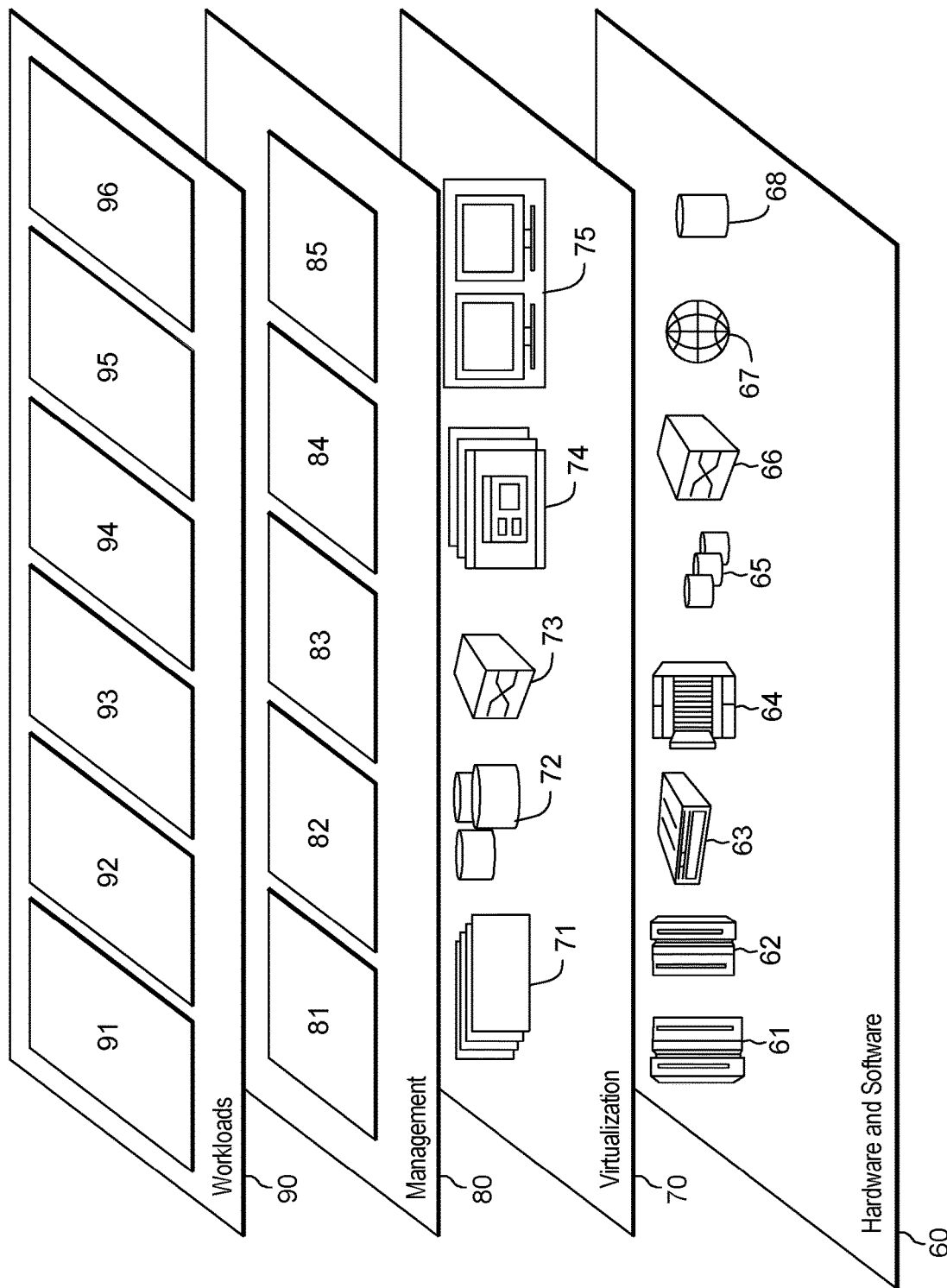
FIG. 7 depicts abstraction model layers according to one embodiment.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 6-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, orchestrator 110 can include one or more computing node 10 and can include one or more program 40 for performing functions described with reference to orchestrator 110 as set forth in the flowchart of FIG. 2. In one embodiment, respective manager nodes 1410 can be defined by a computing node 10 and can respectively include one or more program 40 for performing functions described with reference to respective manager nodes 1410 as set forth in the flowchart of FIG. 2. In one embodiment, a compute nodes 12A-12Z can be defined by a computing node 10 and can include one or more program 40 for performing functions described with reference to a compute node 12A-12Z as set forth in the flowchart of FIG. 2. In one embodiment, one or more client computer device 120A-120Z can include one or more computing node 10 and can include one or more program 40 for performing functions described with reference to one or more client computer device 120A-120Z as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 6 computing node 10 is described as being implemented in a cloud computing environment and accordingly is referred to as a cloud computing node in the context of FIG. 6.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for container orchestration as set forth herein. The processing components 96 can be implemented with use of one or more program 40 described in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:

receiving, by a manager node, from a plurality of compute nodes metrics data, the manager node and the plurality of compute nodes defining a first local cluster of a first computing environment having a first plurality of local clusters, wherein nodes of the compute nodes defining the first local cluster have running thereon container based applications, wherein a first container based application runs on a first compute node of the plurality of compute nodes defining the first local cluster, and wherein a second compute node of the plurality of compute nodes defining the first local cluster runs a second container based application;

wherein the manager node has received from an orchestrator availability data specifying a set of compute nodes available for hosting the first application and wherein the manager node has stored in a data repository of the manager node the availability data specifying a set of compute nodes available for hosting the first application, the set of compute nodes including a certain compute node, the certain compute node being located in a second local cluster of a second computing environment having a second plurality of local clusters;

in response to the running of the first container based application terminating, examining the availability data that the manager node has stored in the data repository of the manager node specifying the set of compute nodes available for hosting the first application;

selecting, in dependence on the examining, the certain compute node of the second computing environment having the second plurality of local clusters for hosting the first container based application; and sending, by the manager node, command data for respawning the first container based application on the certain compute node of the second computing environment having the second plurality of local clusters.

2. The computer implemented method of claim 1, wherein the manager node receives from the orchestrator a trained predictive model, and wherein the selecting is in dependence on a result of the manager node querying the trained predictive model.

3. The computer implemented method of claim 1, wherein the manager node has received from the orchestrator prediction data specifying predicted utilization characteristics of the first and second container based application.

4. The computer implemented method of claim 1, wherein the manager node performs monitoring of traffic from the first container based application during a deployment period of the first container based application, and wherein the manager node performs the selecting the certain compute node in dependence on the monitoring.

5. The computer implemented method of claim 1, wherein the examining the availability data specifying the set of compute nodes available for hosting the first application includes predicting a utilization characteristic of the first container based application, determining that the certain compute node has sufficient predicted availability to accommodate the predicted utilization, and performing the selecting of the certain compute node as a respawn host for hosting the first container based application in dependence on the determining that the certain compute node has sufficient predicted availability to accommodate the predicted utilization.

6. The computer implemented method of claim 1, wherein the examining the availability data specifying the set of compute nodes available for hosting the first application includes predicting a utilization characteristic of the first container based application with reference to a first utilization parameter, determining that the certain compute node has sufficient predicted availability with reference to a first availability parameter associated to the first utilization parameter to accommodate the predicted utilization, and performing the selecting of the certain compute node as a respawn host for hosting the first container based application in dependence on the determining that the certain compute node has sufficient predicted availability to accommodate the predicted utilization.

7. The computer implemented method of claim 1, wherein the manager node receives from the orchestrator a trained predictive model, and wherein the selecting is in dependence on a result of the manager node querying the trained predictive model, wherein the trained predictive model has been trained with use of historical data obtained by the orchestrator from multiple clusters, the multiple clusters including clusters disposed in multiple computing environments other than the first computing environment.

8. The computer implemented method of claim 1, wherein the examining the availability data specifying the set of compute nodes available for hosting the first application includes the manager node querying a first trained predictive model for return of data specifying predicted availability of a plurality of candidate compute nodes including the certain compute node, and querying a second trained predictive model for return of data specifying predicted utilization of the first container based application, the predicted utilization being predicted utilization for the first container based application when the first container based application is respawned, the first container based application is respawned, wherein the first trained predictive model has been trained with use of historical data obtained by the orchestrator from multiple clusters, the multiple clusters including clusters disposed in multiple computing environments other than the first computing environment, wherein the second trained predictive model has been trained with use of historical data obtained by the orchestrator from multiple clusters, the multiple clusters including clusters disposed in multiple computing environments other than the first computing environment, wherein the orchestrator is external from the first computing environment, wherein the first trained predictive model has been pushed from the orchestrator to the manager node, wherein the second trained predictive model has been pushed from the orchestrator to the manager node, wherein the availability data specifying a set of compute nodes available for hosting the first application is defined by the first predictive model.

9. The computer implemented method of claim 1, wherein the examining the availability data specifying the set of compute nodes available for hosting the first application includes the manager node querying a trained predictive model for return of data specifying predicted utilization of the first container based application, and wherein the manager node querying the trained predictive model is performed on demand in response to the first container based application terminating.

10. The computer implemented method of claim 1, wherein the manager node performs monitoring of traffic from the second container based application during a deployment period of the second container based application, wherein the manager node, in response to the second container based application terminating and in dependence on the monitoring, restricts the manager node from selecting as a respawn host a compute node that is external to the first cluster.

11. A computer implemented method comprising:
receiving, by a manager node, from a plurality of compute nodes metrics data, the manager node and the plurality of compute nodes defining a first local cluster of a first computing environment, wherein nodes of the compute nodes defining the first local cluster have running thereon container based applications, wherein a first container based application runs on a first compute node of the plurality of compute nodes defining the first local cluster, and wherein a second compute node of the plurality of compute nodes defining the first local cluster runs a second container based application;
wherein the manager node has received from an orchestrator availability data specifying a set of compute nodes available for hosting the first application, the set of compute nodes including a certain compute node, the certain compute node being located in a second local cluster of a second computing environment;
in response to the running of the first container based application terminating, examining the availability data specifying the set of compute nodes available for hosting the first application;
selecting, in dependence on the examining, the certain compute node for hosting the first container based application; and
sending, by the manager node, command data for respawning the first container based application on the certain compute node, wherein the manager node performs monitoring of traffic from the first container based application during a deployment period of the first container based application, and wherein the manager node performs the selecting the certain compute node in dependence on the monitoring.

12. The computer implemented method of claim 11, wherein the manager node provides a classification of the first container based application in dependence on the monitoring, and wherein the manager node performs the selecting the certain compute node in dependence on the classification.

13. The computer implemented method of claim 11, wherein the manager node provides a classification of the first container based application as a Global Communication Container (GCC) in dependence on the monitoring indicating that (a) a level of local cluster messaging from the first container based application was below a first threshold during the deployment period, and (b) a level of computing environment external computing environment messaging from the first container based application was above a second threshold during the deployment period, and wherein the manager node performs the selecting the certain compute node in dependence on the classification by qualifying the selecting of the certain compute node as a respawn host based on the GCC classification.

14. The computer implemented method of claim 11, wherein the manager node provides a classification of the first container based application as a Global Communication Container (GCC) in dependence on the monitoring indicating that (a) a level of local cluster messaging from the first container based application was below a first threshold during the deployment period, and (b) a level of computing environment external computing environment messaging from the first container based application was above a second threshold during the deployment period, and wherein the manager node performs the selecting the certain compute node in dependence on the classification by qualifying the selecting of the certain compute node as a respawn host based on the GCC classification, wherein the manager node performs monitoring of traffic from the second container based application during a deployment period of the second container based application, and provides a classification of the first container based application as a Local Communication Container (LCC) in dependence on the monitoring, wherein the manager node, in response to the second container based application terminating, restricts the manager node from selecting as a response compute node a compute nodes that is external to the first cluster.

15. The computer implemented method of claim 11, wherein the manager node provides a classification of the first container based application as a Global Communication Container (GCC) in dependence on the monitoring indicating that (a) a level of local cluster messaging from the first container based application was below a first threshold during the deployment period, and (b) a level of computing environment external messaging from the first container based application was above a second threshold during the deployment period, and wherein the manager node performs the selecting the certain compute node in dependence on the classification by qualifying the selecting of the certain compute node as a respawn host based on the GCC classification, wherein the manager node performs monitoring of traffic from the second container based application during a deployment period of the second container based application, and provides a classification of the first container based application as a Local Communication Container (LCC) in dependence on the monitoring, wherein the manager node, in response to the second container based application terminating, restricts the manager node from selecting as a respawn host a compute node that is external to the first cluster.

16. The computer implemented method of claim 11, wherein the manager node performs monitoring of traffic from the second container based application during a deployment period of the second container based application, and provides a classification of the first container based application as a Local Communication Container (LCC) in dependence on the monitoring, wherein the manager node, in response to the second container based application terminating, restricts the manager node from selecting as a respawn host a compute node that is external to the first cluster.

17. The computer implemented method of claim 11, wherein the manager node provides a classification of the first container based application as a Global Communication Container (GCC) in dependence on the monitoring indicating that a level of computing environment external messaging from the first container based application was above a second threshold during the deployment period, and wherein the manager node performs the selecting the certain compute node in dependence on the classification by qualifying the selecting of the certain compute node as a respawn host based on the GCC classification, wherein the manager node performs monitoring of traffic from the second container based application during a deployment period of the second container based application, and provides a classification of the first container based application as a Local Communication Container (LCC) in dependence on the monitoring, wherein the manager node, in response to the second container based application terminating, restricts the manager node from selecting as a respawn host a compute node that is external to the first cluster.

18. The computer implemented method of claim 11, wherein the method is characterized by one or more of the following selected from the group consisting of: (a) the examining the availability data specifying the set of compute nodes available for hosting the first application includes the manager node querying a first trained predictive model for return of data specifying predicted availability of a plurality of candidate compute nodes including the certain compute node, wherein the first trained predictive model has been trained with use of historical data obtained by the orchestrator from multiple clusters, the multiple clusters including clusters disposed in multiple computing environments other than the first computing environment, wherein the orchestrator is external from the first computing environment, and wherein the first trained predictive model has been pushed from the orchestrator to the manager node, and (b) the examining the availability data specifying the set of compute nodes available for hosting the first application includes the manager node querying a second trained predictive model for return of data specifying predicted utilization of the first container based application, the predicted utilization being predicted utilization for the first container based application when the first container based application is respawned, wherein the second trained predictive model has been trained with use of historical data obtained by the orchestrator from multiple clusters, the multiple clusters including clusters disposed in multiple computing environments other than the first computing environment, wherein the orchestrator is external from the first computing environment, wherein the second trained predictive model has been pushed from the orchestrator to the manager node.

19. The computer implemented method of claim 11, wherein the monitoring of traffic from the first container based application includes determining a level of computing environment external messaging from the first container based application during the deployment period, and wherein the manager node performs the selecting the certain compute node in dependence on the determining the level of computing environment external messaging from the first container based application during the deployment period of the first container based application.

20. A computer implemented method comprising:
receiving, by a manager node, from a plurality of compute nodes metrics data, the manager node and the plurality of compute nodes defining a first local cluster of a first computing environment, wherein nodes of the compute nodes defining the first local cluster have running thereon container based applications, wherein a first container based application runs on a first compute node of the plurality of compute nodes defining the first local cluster, and wherein a second compute node of the plurality of compute nodes defining the first local cluster runs a second container based application;

wherein the manager node has received from an orchestrator availability data specifying a set of compute nodes available for hosting the first application, the set of compute nodes including a certain compute node, the certain compute node being located in a second local cluster of a second computing environment;

in response to the running of the first container based application terminating, examining the availability data specifying the set of compute nodes available for hosting the first application;

selecting, in dependence on the examining, the certain compute node for hosting the first container based application; and sending, by the manager node, command data for respawning the first container based application on the certain compute node, wherein the manager node performs monitoring of traffic from the second container based application during a deployment period of the second container based application, wherein the manager node, in response to the second container based application terminating and in dependence on the monitoring, restricts the manager node from selecting as a respawn host a compute node that is external to the first cluster.

* * * * *